(12) United States Patent
Theurer

(10) Patent No.: US 8,015,148 B2
(45) Date of Patent: Sep. 6, 2011

(54) SELECTIVE PROFILER FOR USE WITH TRANSACTION PROCESSING APPLICATIONS

(75) Inventor: Andrew Matthew Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1905 days.

(21) Appl. No.: 10/880,720

(22) Filed: Jun. 30, 2004

(65) Prior Publication Data

US 2006/0004865 A1  Jan. 5, 2006

(51) Int. Cl.
*G06F 7/00* (2006.01)
*G06F 17/30* (2006.01)

(52) U.S. Cl. .................. 707/607; 707/999.003
(58) Field of Classification Search ............ 707/607
See application file for complete search history.

(56) References Cited

U.S. PATENT DOCUMENTS

| | | | |
|---|---|---|---|
| 6,041,352 A * | 3/2000 | Burdick et al. | 709/224 |
| 6,078,956 A * | 6/2000 | Bryant et al. | 709/224 |
| 6,901,442 B1 * | 5/2005 | Schwaller et al. | 709/224 |
| 2002/0198984 A1 * | 12/2002 | Goldstein et al. | 709/224 |
| 2003/0005113 A1 * | 1/2003 | Moore | 709/224 |
| 2004/0210531 A1 * | 10/2004 | Barron et al. | 705/44 |
| 2005/0033671 A1 * | 2/2005 | Hahn-Carlson | 705/34 |

* cited by examiner

*Primary Examiner* — Apu M Mofiz
*Assistant Examiner* — Jared M Bibbee
(74) *Attorney, Agent, or Firm* — Matthew Talpis; Anthony VS England; Casimer K. Salys

(57) ABSTRACT

A server system suitable for processing transactions includes transaction processing means to process requests issued by client systems. A transaction profiler records information regarding transactions processed by the server. Profiled transactions are selected for inclusion in a cumulative database according to a selection criteria. The transaction processor may be an HTTP server, a file server, or a database server. The profiler may be enabled by the processing means just before processing a request and disabled upon completion. In one embodiment, the transaction profiler is configured to calculate a transaction response time as the difference between the time the transaction processing means enables the profiling means and the time the transaction processing means disables the profiling means. In this embodiment, the selection criteria includes a minimum transaction response time wherein only transaction profiles indicating a response time in excess of the minimum transaction time are included in the cumulative database.

2 Claims, 4 Drawing Sheets

```
501 ProfileTrans==TRUE; /enable Profiler
502 Process Transaction; /triggers Profiler
503 Profile Trans==FALSE; /disable Profiler
```

204

```
504 IF Profile Trans & Transaction Processing; /if enabled and triggered
505   TimeIn==current time; /record start time
506   UNTIL Profile Trans FALSE: store TransactionStats to Temp;
507   TimeOut==current time; /record end time
508   Trans Time==Time Out - Time In; /calculate response time;
509   IF Trans Time > Threshold; /Threshold is a user defined filter
510     Copy TEMP to CUMULATIVE; /store only slow transactions to default buffer;
511   END;
      Clear TEMP; /empty TEMP buffer for next transaction profile;
      END;
```

SELECTIVE PROFILER FOR USE WITH TRANSACTION PROCESSING APPLICATIONS

BACKGROUND

1. Field of the Present Invention

The present invention is in the field of data processing systems, and more particularly in data processing systems that are extensively used to process transactions.

2. History of Related Art

Many data processing applications can be characterized as transaction processing applications. A conventional web server, for example, services transactions in the form of HTTP requests. The server detects and receives requests, takes appropriate action to respond to received requests, and returns some form of response to the requestor. Other transaction processing applications include data base servers and file servers.

In the context of data processing applications, monitoring the performance or efficiency of transaction processing applications is desirable to detect problems that may prevent transactions from being processed in a timely fashion. Typically, transaction monitoring is achieved by aggregating statistics for a large number of transactions and then averaging the statistics based on the collected data to determine, for example, the response time of a typical transaction. This form of monitoring is not suitable, however, in cases where the number of transactions "of interest" from a performance perspective is relatively small. In such cases, the relatively large number of uninteresting transactions may tend to skew the data such that any meaningful information regarding interesting transactions is obscured or lost. It would be desirable to implement a system and method for monitoring the performance of a transaction processing application in a way that enabled the user to focus on transactions of most interest, such as transactions that take a very long time to complete, even if the number of such transactions is relatively small.

SUMMARY OF THE INVENTION

The identified objective is achieved by a server system, server code, and server method suitable for processing transactions according to the present invention including transaction processing means to process requests issued by client systems. A transaction profiler records information regarding transactions processed by the server. Profiled transactions are selected for inclusion in a cumulative database according to a selection criteria. The transaction processor may be an HTTP server, a file server, or a database server. The profiler may be enabled by the processing means just before processing a request and disabled upon completion. In one embodiment, the transaction profiler is configured to calculate a transaction response time as the difference between the time the transaction processing means enables the profiling means and the time the transaction processing means disables the profiling means. In this embodiment, the selection criteria includes a minimum transaction response time wherein only transaction profiles indicating a response time in excess of the minimum transaction time are included in the cumulative database.

BRIEF DESCRIPTION OF THE DRAWINGS

Other objects and advantages of the invention will become apparent upon reading the following detailed description and upon reference to the accompanying drawings in which:

FIG. 5 depicts selected details, in the form of pseudo-code, of the software components of FIG. 2 according to an embodiment of the present invention.

Figure 1:
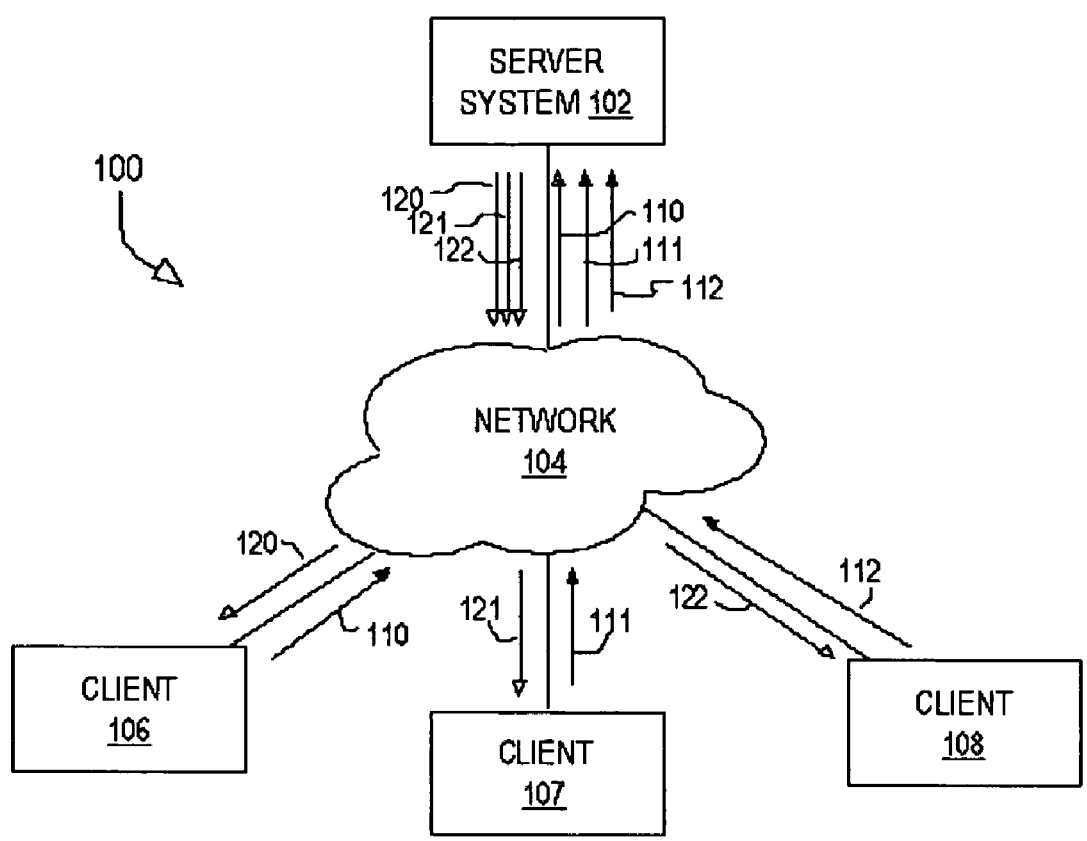
FIG. 1 is a block diagram of selected elements of a transaction processing system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

The invention is generally concerned with collecting statistics relevant to the performance of a transaction processing system. More specifically, the invention is a system and method for selectively profiling processed transactions. The system includes functionality enabling a user to select or filter the transactions of interest based on one or more criteria of interest. By enabling a user to selectively choose the transactions to be profiled, the invention enables the user to gain greater insight into the types of problems a transaction processing system might exhibit.

Referring now to FIG. 1, selected elements of a transaction processing system 100 according to one embodiment of the present invention are depicted. In the depicted embodiment, system 100 includes a transaction processing server system 102 and a plurality of transaction requesters or clients 106-108. Server system 102 and clients 106-108 are interconnected via a network 104, which may represent an Ethernet or other local area network (LAN). In other implementations, network 104 may represent a wide area network (WAN) such as the Internet.

The present invention is primarily directed at transaction processing applications. In FIG. 1, transaction processing associated with system 100 is illustrated by arrows 110-112, which represent transaction requests initiated by clients 106-108 respectively, and arrows 120-122, which represent the corresponding responses generated by server system 102 and transmitted to clients 106-108 respectively. Transaction requests 110-112 can be simple requests (e.g., a Web request initiated when a user enters a web site on its browser) or complex requests (e.g., multi-dimensioned data queries). Server system 102 is configured to detect transaction requests 110-112, process each of the requests, generate transaction responses 120-122, and send the responses back to the appropriate requester. Server system 102 as contemplated herein may include elements of commercially distributed servers including, as examples, a transaction-based e-server such as the Web Sphere server application from IBM Corporation, or a traditional web server such as the widely implemented Apache HTTP server from the Apache Software Foundation. It will be appreciated that the description of system 100 provided herein encompasses substantially all forms of transaction processing server applications.

Figures 2, 3:
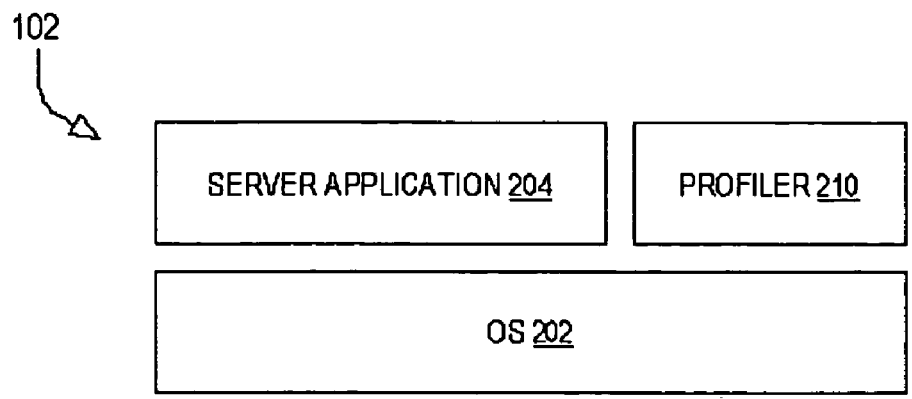
FIG. 2 is a block diagram illustrating selected software components of the system of FIG. 1 including a transaction profiler according to the present invention.
FIG. 3 is a conceptual representation of a data buffer or table suitable for storing information relevant to transactions processed within the system of FIG. 1.

Portions of the present invention may be implemented as a set or sequence of computer executable instructions (computer software or computer code) stored on a computer readable medium (storage). The medium may be a persistent storage medium such as a hard disk, CD, magnetic tape, or DVD. During execution, portions of the code may also reside in volatile medium such as a system memory (DRAM) and/or cache memory (SRAM). Referring now to FIG. 2, selected software components of server system 102 according to an embodiment of the present invention are depicted. In the depicted embodiment, server system 102 includes an operating system 202, a server application 204, and an application profiler 210. Operating system 202 is most likely a Unix-based or Unix derivative operating system such as Linux or AIX although, in other embodiments, alternative operating systems including the Windows® family of operating systems from Microsoft Corporation may be used.

Server application 204 represents the software code providing the system or systems on which it is installed with its basic server functionality. As stated previously, server application 204 is intended to represent any of a variety of transaction based server types including web servers, files servers, and database servers. For purposes of illustrating the present invention, server application 204 is presumed to be a web server application (also sometimes referred to as an HTTP server application).

Profiler 210 is a special purpose application designed to provide statistical insight into the performance of server application 204. Profiler 210 preferably includes code designed to maintain a database of information indicative of the performance of server application 204. Referring to FIG. 3, a conceptual representation of an exemplary database 300 maintained by profiler 210 is depicted. In the depicted embodiment, database 300 includes a plurality of entries 301 where each entry 301 corresponds to a transaction that was processed by server application 204. Each entry 301 includes data for one or more parameters associated with the corresponding transaction. In the depicted embodiment, the parameters that are profiled or monitored include a transaction identifier (ID) 304, a time in value 306, a data requested parameter 308, a time out parameter 310, and a response parameter 312. Although FIG. 3 illustrates these particular parameters explicitly, it will be appreciated that many other parameters associated with a transaction might be profiled as well. The source of each transaction request, for example, might be maintained as a parameter in database 300.

The depicted implementation of database 300 is suitable for profiling applications that emphasize the transaction response time as a parameter of significant interest. In such applications, tracking the response time is achieved by recording, for each transaction, a beginning time (time in 306) and ending time (time out 310) and calculating the response time 312 as the difference between the two. The data requested parameter 308, which indicates the amount of data required to respond to the request, might be monitored as a basis for profiling "like" transactions (i.e., data requested parameter 308 may be used, for example, as a basis for filtering requests that request approximately the same quantity of data).

Someone wishing to verify that server application 204 is performing adequately would most likely wish to profile the response times for a large number of transactions. Anecdotal evidence suggests, however, that it is not uncommon to encounter a server application 204 that produces adequate response times for a large majority of the transactions that it handles. For such applications, cumulating data for a large number of transactions, the vast majority of which exhibit acceptable response times, tends to "drown" out the relatively few transactions that exhibit unacceptable response times. In many on-demand applications, however, it is precisely the very few slow transactions that are of most interest. Imagine an on-line stock trading server application, for example, that guarantees order confirmation with a specified window that is presumably quite short. In a server application of this type, substantially every transaction must be processed in the specified time window or customers will quickly subscribe with a more reliable provider.

The present invention addresses the need to perform selective transaction profiling so that the profiled transaction database is filtered to contain only information regarding the most important transactions (e.g., transactions that fail to meet a specified response time). According to the present invention, server application 204 includes code for enabling and disabling profiler 210. With such code, server application 204 may enable profiler 210 just prior to initiating a transaction processing sequence and disable profiler 210 just after the transaction processing sequence is complete. In this way, the server application 204 can determine the response time for the application. In addition, profiler 210 is configured to store transaction profiles into a temporary buffer initially. After a transaction is completed, profiler 210 determines whether the transaction profile should be incorporated into the cumulative transaction profile database (exemplified by database 300 of FIG. 3). Profiler 210 determines which transactions to accumulate and which transactions to discard based upon a specified criteria such as whether the transaction exhibits adequate response times. The specified criteria is most likely a user specified criteria such as a user specified response time threshold.

Referring to FIG. 5, selected code from server application 204 and profiler 210 is depicted to illustrate additional details of an embodiment of the present invention. The depicted code is written in pseudo-code for illustrative purposes. In the depicted implementation, server application 204 cooperates with profiler 210 to selectively profile transactions processed by server application 204. As illustrated in FIG. 5, server application 204 includes only two lines of code that are necessary to implement the selective profiling functionality. Specifically, server application 204 includes a line (501) of code to enable profiler 210 and a line (503) of code to disable profiler 210. Lines 501 and 503 are preferably located immediately preceding and immediately after the portion of server application 204 that performs the actual transaction processing (represented in FIG. 5 by line 502). In this implementation, a Boolean variable (ProfileTrans) is defined to indicate the state of profiler 210. Just prior to processing a transaction, server application 204 sets the ProfileTrans variable to TRUE. After setting ProfileTrans, server application 204 begins to process the current transaction (such as by calling a Process Transaction subroutine or module in line 502). The Process Transaction module preferably interrupts, triggers, or otherwise informs profiler 210 that processing of a new transaction has been initiated.

If profiler 210 determines (line 504) that server application 210 is processing a transaction and has set the ProfileTrans variable, profiler 210 then sets (line 505) the value of a TimeIn variable to the current time. Thereafter, the depicted implementation of profiler 210 monitors (line 506) the ProfileTrans variable for a change in state and stores transaction information (the transaction profile) into a temporary storage buffer. The transaction information collected by profiler 210 and stored into the temporary buffer is implementation specific, but may include information such as the amount of data requested, the identity of requested date (e.g., filename), an identity of the request (e.g., IP address), and so forth. In this implementation, server application 204 is presumed to clear or reset the ProfileTrans variable upon completing a transaction servicing sequence.

When profiler 210 detects a change in the state of the ProfileTrans variable, thereby indicating that server application 204 has processed a transaction, profiler 210 records (line 507) the time in the TimeOut variable and calculates (line 508) the transaction time (TransTime) as the difference between the Timein and TimeOut. The transaction time is incorporated into the transaction profile in the temporary buffer. Profiler 210 is configured to accumulate transaction profiles selectively, based upon specified filtering criteria.

In one implementation, transaction profiles are accumulated based upon their corresponding transaction times. In this implementation, profiler 210 determines (line 509) whether the transaction time for a particular transaction exceeds a threshold value, which is preferably alterable by the user. If the transaction time exceeds the specified threshold, the depicted embodiment of profiler 210 preserves the corresponding transaction profile by copying (line 510) the profile from the temporary buffer to a cumulative buffer. In this manner, the cumulative storage buffer is reserved for transactions that are of interest to the user, most likely because these transactions exhibit some performance or other characteristic that is atypical and undesirable.

Figure 4:
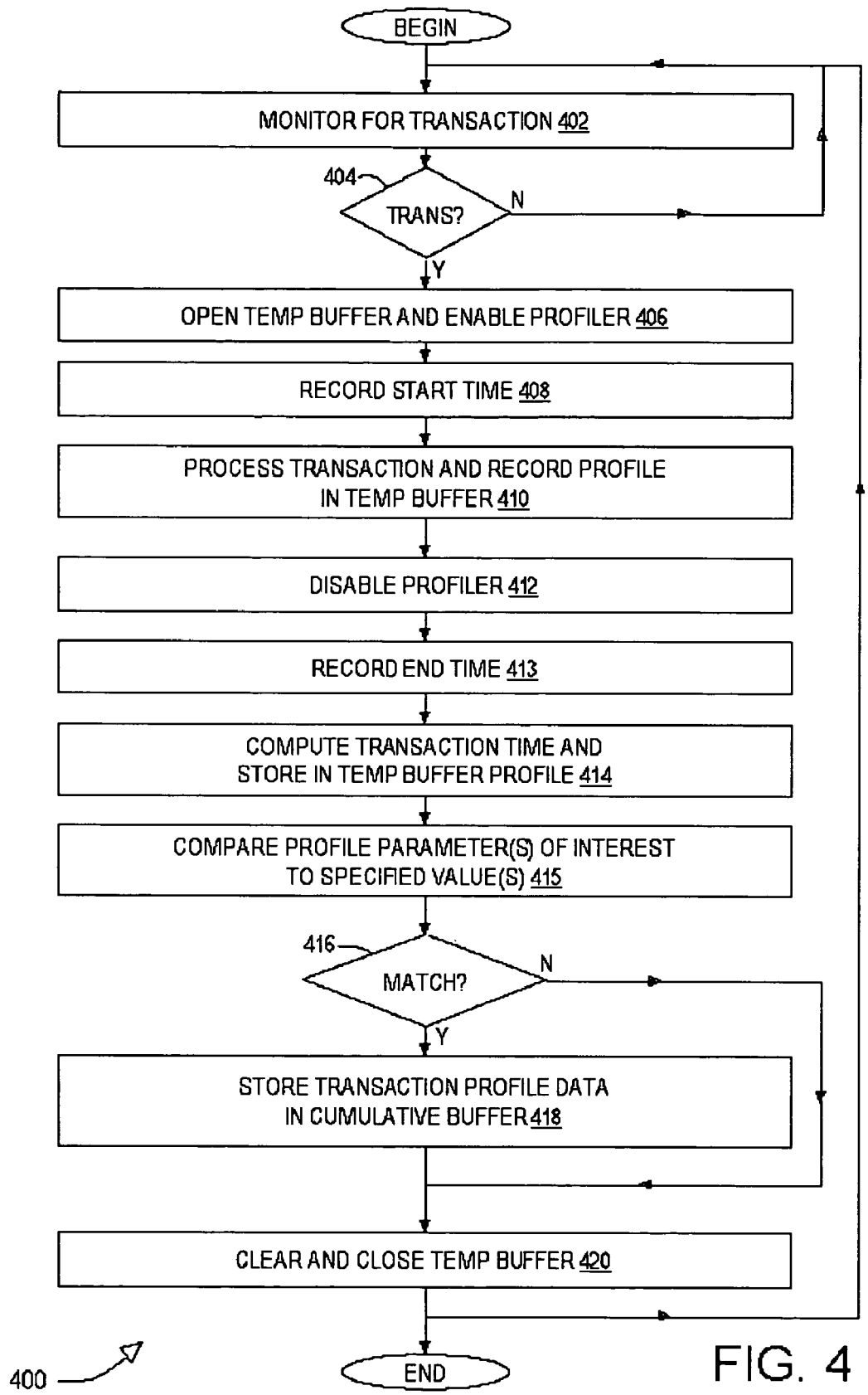
FIG. 4 is a flow diagram of a method of monitoring transactions according to an embodiment of the present invention.

The illustrative computer code of FIG. 5, when executed, performs an embodiment of a more generalized method 400 of selectively profiling data processing transactions represented by the flow diagram of FIG. 4. In the depicted embodiment of method 400, a system such as server system 102 of FIG. 1 is monitored (block 402) for transaction activity. Upon detecting a transaction (block 404), a profiler is enabled and a temporary buffer is opened (block 406). The time is recorded (block 408) and stored as the start time for the transaction. The transaction is then processed (block 410) by the server system and the transaction profile is stored in the temporary buffer. Following completion of the transaction processing, the profiler is disabled (block 412) and the time is recorded (block 413) and stored as the end time. The transaction time is computed (block 414) and stored in the transaction profile in the temporary buffer.

To determine whether the current transaction profile will be included into the transaction profile database, a profiler parameter of interest is compared (block 415) to a threshold value. The parameter of interest enables the user to specify which transactions the user wants to include in the profile database. Selection can be based on any parameter or set of parameters that a profiler is able to track including, as examples, the origin of a request, the size and location of the data requested, the transaction processing time, the time the request was initiated, and so forth.

If the values of the specified parameters match (block 416), the transaction profile is copied from the temporary buffer and stored (block 418) to the cumulative buffer, which serves as the profiled transaction database. If the parameter values for the current transaction do not match the criteria specified by the user, the transaction profile is not incorporated into the cumulative database. The temporary buffer is then cleared (block 420) regardless of whether the transaction profile was stored in the cumulative database. Method 400 thus provides a flexible mechanism for obtaining insight into the performance characteristics of a transaction processing server and for discovering performance issues that may occur on a relatively infrequent basis, but which are concerns nevertheless.

It will be apparent to those skilled in the art having the benefit of this disclosure that the present invention contemplates a mechanism for selectively profiling transactions of a transaction processing application. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of characterizing a transaction processing system, comprising:

defining a threshold value for a parameter of interest;

profiling a transaction processed by the transaction processing system and storing the resulting transaction profile, including a profile value for the parameter of interest, in a temporary buffer;

comparing the profiled value to the threshold value;

responsive to the profiled value having a specified relationship to the threshold value, adding the transaction profile to a profile database, wherein the profile database accumulates only selected ones of the transaction profiles, the selected ones of the transaction profiles being for those transactions wherein the parameter of interest exhibits the specified relationship to the threshold value; and conveying the selected transaction profiles from the profile database to a user, wherein profiling the transaction comprises:

recording a start time by a transaction profiler responsive to receiving an enable signal from a transaction processing application prior to the transaction processing application processing the transaction request; and recording a stop time by the transaction profiler and then calculating a response time by the transaction profiler responsive to receiving a disable signal from the transaction processing application after the transaction processing application processes the transaction request, wherein the response time is calculated as a difference between the start time and the stop time, wherein the transaction profiler, responsive to being disabled, performs the comparing of the transaction response time and a threshold response time and copies the transaction profile from the temporary buffer to the profile database only if the transaction response time exceeds the threshold value, wherein the transaction processing system tends to process substantially all transactions within a specified response time, so that transaction profiles stored in the profile database are substantially reduced in number by copying the transaction profile to the profile database only if the transaction response time exceeds the threshold value, wherein processing the transaction includes the transaction processing system processing a request and providing data responsive to the request and wherein the transaction profile includes a transaction identifier and a data requested parameter, and wherein the data requested parameter indicates an amount of the data provided in the response to the request.

2. The method of claim 1, wherein the transaction processing system is a Linux-based web server.

* * * * *